United States Patent [19]

Araki

[11] Patent Number: 5,220,510
[45] Date of Patent: Jun. 15, 1993

[54] COORDINATE SYSTEM CORRECTING APPARATUS FOR MACHINE TOOL

[75] Inventor: Hiromi Araki, Chita, Japan

[73] Assignee: Toyota Jidosha Kabushiki Kaisha, Aichi, Japan

[21] Appl. No.: 675,969

[22] Filed: Mar. 27, 1991

[30] Foreign Application Priority Data

Mar. 30, 1990 [JP] Japan .................. 2-87060

[51] Int. Cl.⁵ .................. G06F 15/46; G05B 23/02
[52] U.S. Cl. .................. 364/474.360; 364/474.35; 364/474.37; 364/551.02; 318/572
[58] Field of Search ............. 364/474.35, 474.36, 364/474.37, 551.02; 318/572

[56] References Cited

U.S. PATENT DOCUMENTS

| | | | |
|---|---|---|---|
| 3,555,254 | 1/1971 | Gerber | 364/474.35 |
| 4,437,151 | 3/1984 | Hurt et al. | 364/474.35 |
| 4,561,050 | 12/1985 | Iguchi et al. | |
| 4,590,578 | 5/1986 | Barto, Jr. et al. | 364/474.36 |
| ,4796,195 | 1/1989 | Haggerty | 364/474.35 |
| 4,875,177 | 10/1989 | Jarman | 364/474.35 |
| ,4945,501 | 7/1990 | Bell et al. | 364/474.35 |
| 5,091,861 | 2/1992 | Geller et al. | 364/474.35 |

FOREIGN PATENT DOCUMENTS

| | | |
|---|---|---|
| 0326625A1 | 8/1989 | European Pat. Off. . |
| 0329531A1 | 8/1989 | European Pat. Off. . |
| 0353585A2 | 2/1990 | European Pat. Off. . |
| 3302063A1 | 7/1984 | Fed. Rep. of Germany . |
| 61-214950 | 9/1986 | Japan . |
| 63-37402 | 2/1988 | Japan . |

OTHER PUBLICATIONS

English Abstract of Japanese Patent Application Kokai No. 63-37402, Patent Abstracts of Japan, unexamined applications, P field, vol. 12, No. 245, Jul. 12, 1988, The Patent Office Japanese Government, pp. 105, 729.

Primary Examiner—Joseph Ruggiero
Assistant Examiner—Steven R. Garland
Attorney, Agent, or Firm—Finnegan, Henderson, Farabow, Garrett, Dunner

[57] ABSTRACT

A coordinate system correcting apparatus corrects a reference coordinate system set for a work space of a machine tool. A plurality of jig members are distributed on a work table of the machine tool, each of the jig members has a plurality of right-angled parallelepiped recesses, and an intersection of three orthogonal planes of each of the recesses forms a space lattice point. The space lattice points defined by the jig members coincide with predetermined normal space lattice points if the machine tool is not distorted, and if the machine tool is distorted, deviate from the normal space lattice points. Eight adjacent space lattice points are located at vertexes of a hexahedron, respectively. When the machine tool is distorted, the jig members define distorted space lattice points, which are measured with a probe unit. According to the normal space lattice points and distorted space lattice points, the reference coordinate system is three-dimensionally corrected for each of the hexahedrons.

15 Claims, 15 Drawing Sheets

COORDINATE SYSTEM CORRECTING APPARATUS FOR MACHINE TOOL

BACKGROUND OF THE INVENTION

1. Field of the Invention

The present invention relates to a coordinate system correcting apparatus for a machine tool.

2. Description of the Related Art

When a machine tool body or a worktable for placing or a workpiece thereon is distorted, a coordinate system comprising orthogonal axes X, Y, and Z set in a work space of the machine tool is also distorted, and thus the positioning accuracy and processing accuracy are adversely affected. To solve this problem, a known coordinate system correcting apparatus (for example, as disclosed in Japanese Unexamined Patent Publication No. 63-37402) divides any one (for example, the axis Z) of the three axes into segments at predetermined intervals. In each of planes orthogonally crossing the axis Z at the respective points of division, the apparatus precisely measures the coordinates on the axes X and Y of a group of predetermined locations, using, for example, an optical measuring apparatus disposed on a different coordinate system. According to a result of the measurement, the apparatus finds distortions from coordinates on normal axes X and Y, and based on the distortions, corrects the coordinates on the axes X and Y in each of the divided segments of the axis Z.

Since this coordinate system correcting apparatus selects one axis as a reference, to measure distortions of the other two axes, and determines correction quantities according to a result of the measurement, a distortion of the reference axis itself will not be corrected. In addition, distortions of the other axes caused by a distortion of the reference axis at an intermediate point between adjacent points of the division will not be corrected. This apparatus, therefore, cannot precisely position and process a workpiece.

SUMMARY OF THE INVENTION

An object of the present invention is to provide a coordinate system correcting apparatus that can accurately, efficiently, and three-dimensionally correct a coordinate system in accordance with distortions of a machine tool.

Therefore, according to the present invention, there is provided a coordinate system correcting apparatus for corrrecting a reference coordinate system set for a work space of a machine tool, comprising:

a jig for defining a plurality of space lattice points that are distributedly and three-dimensionally arranged to serve as references of a reference coordinate system, the space lattice points defined by the jig coinciding with predetermined normal space lattice points when the machine tool is not distorted;

a storage means for storing the normal space lattice points;

a measuring means for measuring distorted space lattice points defined by the jig, the distorted space lattice points deviating from the normal space lattice points when the machine tool is distorted; and a correcting means for correcting the reference coordinate system according to the normal space lattice points and distorted space lattice points.

The present invention may be more fully understood from the description of a preferred embodiments of the invention set forth below, together with the accompanying drawings.

DESCRIPTION OF A PREFERRED EMBODIMENT

Figure 1:
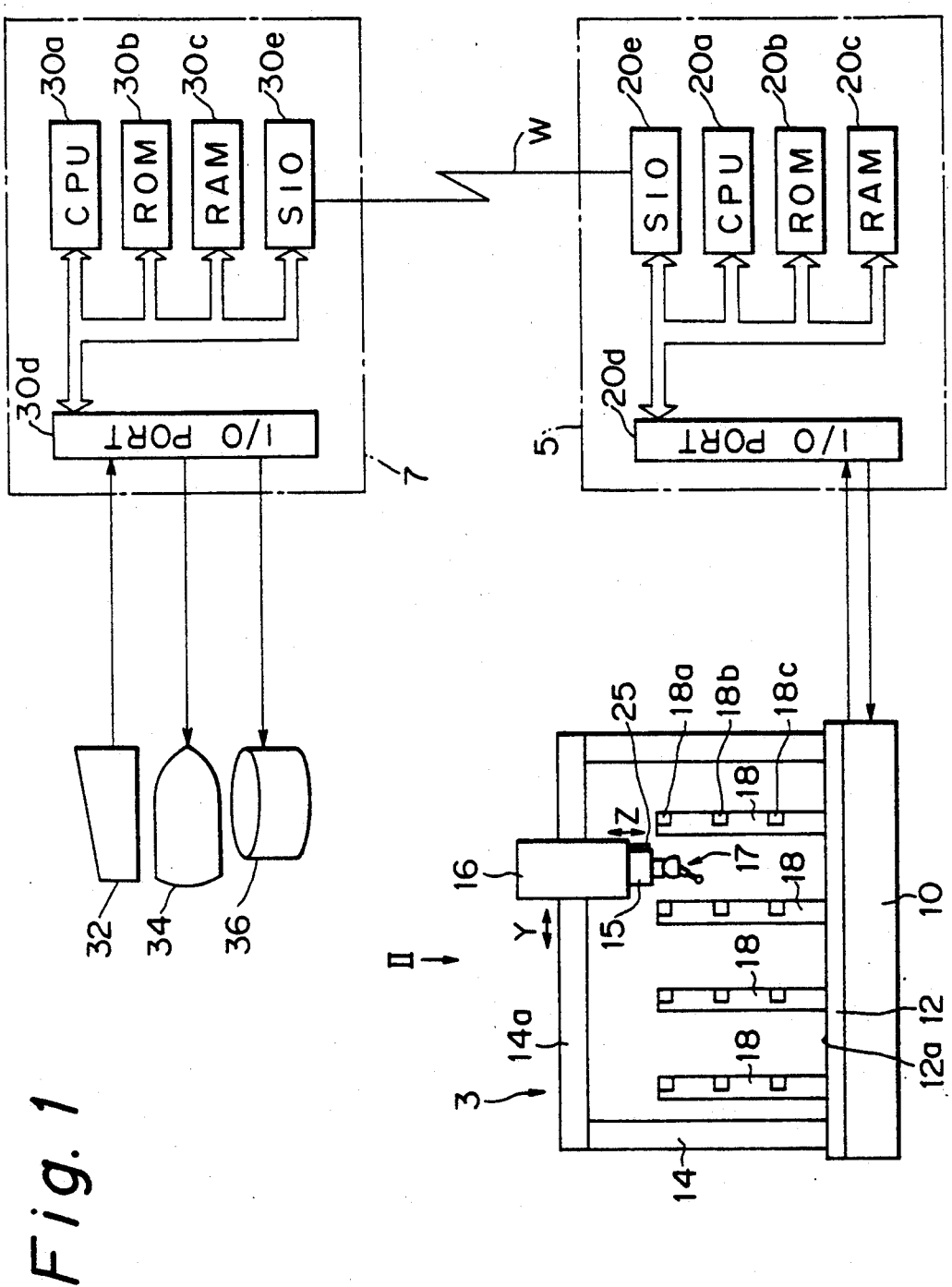
FIG. 1 is a general view of a coordinate system correcting apparatus.

FIG. 1 shows a general arrangement of a coordinate system correcting apparatus according to the present invention.

In FIG. 1, the coordinate system correcting apparatus comprises a machine tool 3, a controller 5 for controlling the machine tool, and an information processor 7. This system automatically measures distortions in an coordinate system comprising three axes X, Y, and Z set in a work space of the machine tool, and three-dimensionally corrects the coordinate system in accordance with the distortions.

Figure 2:
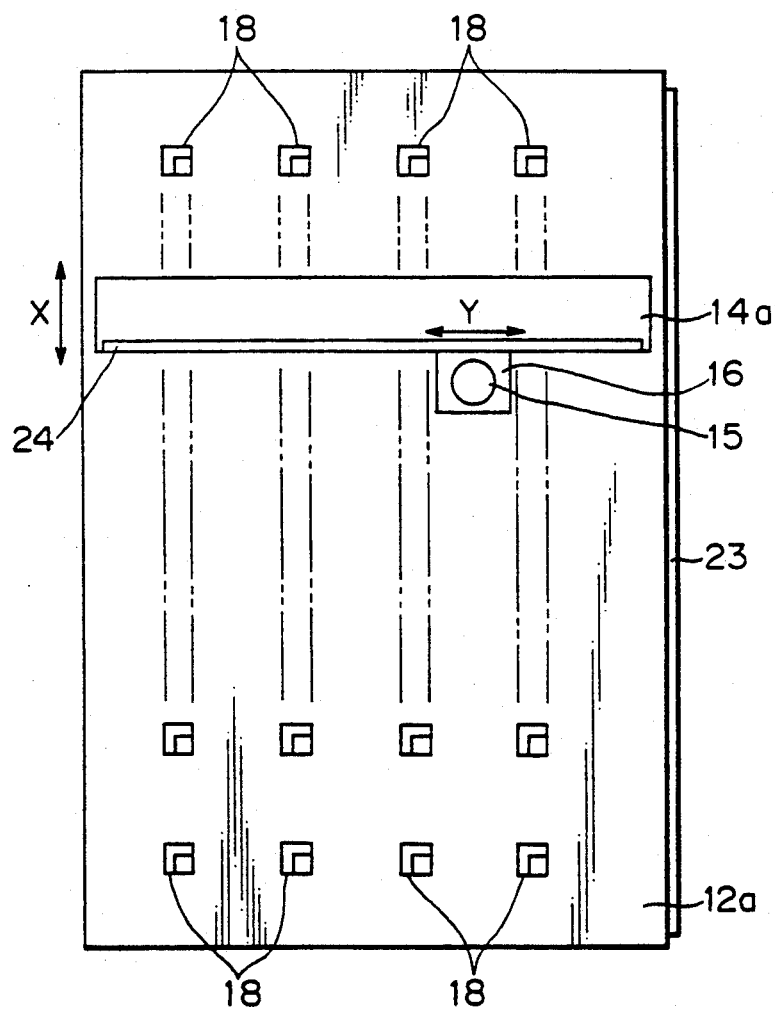
FIG. 2 is a side view taken along an arrow mark II of FIG. 1.

Referring to FIGS. 1 and 2, the machine tool 3 has a machine base 10, a work table 12 disposed on the machine base 10, an arch-type frame 14 that can reciprocate on the work table 12 along the axis X, a horizontal rail 14a disposed on the frame 14, a column 16 that is fitted to and can reciprocate on the horizontal rail 14a along axis Y, and a quill 15 that is arranged in the column 16 and able to reciprocate along the axis Z.

An shown in FIGS. 1 through 4, a top surface 12a of the work table 12 has many fitting holes (not shown) arranged in a rectangular matrix, and each of the fitting holes receives a square rod shaped jig member 18. The jig members 18 are vertically fixed to the top surface 12a of the work table 12 at predetermined positions, and each jig member 18 has cubic recesses 18a, 18b, and 18c at a plurality of longitudinal (vertical) positions, for example, upper, middle, and lower positions. Each of the recesses 18a to 18c is formed of three inner wall surfaces u, v, and w that are orthogonal to one another. The jig member 18 is fixed to the top surfaces u, v, and w are in parallel with coordinate planes X-Y, X-Z, and Y-Z of the coordinate system, respectively.

Figure 3A:
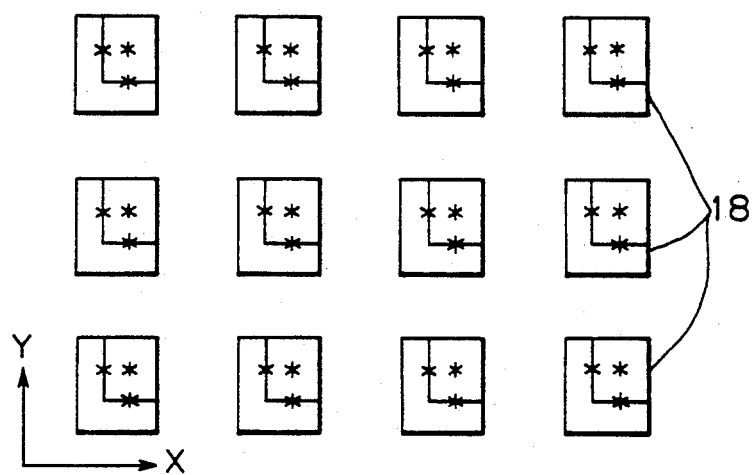
FIGS. 3(A) and 3(B) are views explaining an arrangement of jig members.
Figure 3B:
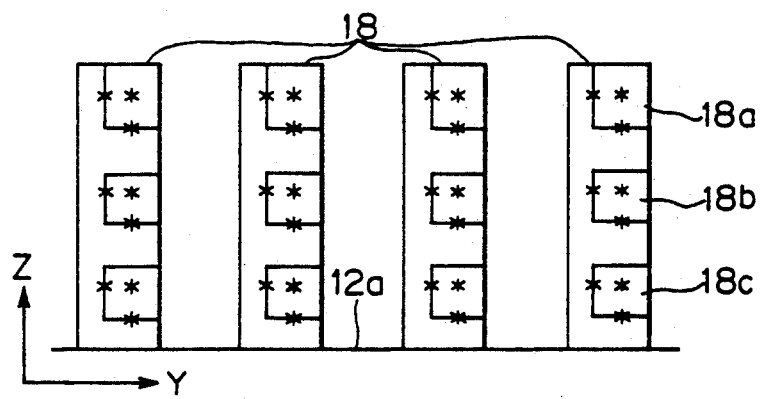
Figure 4:
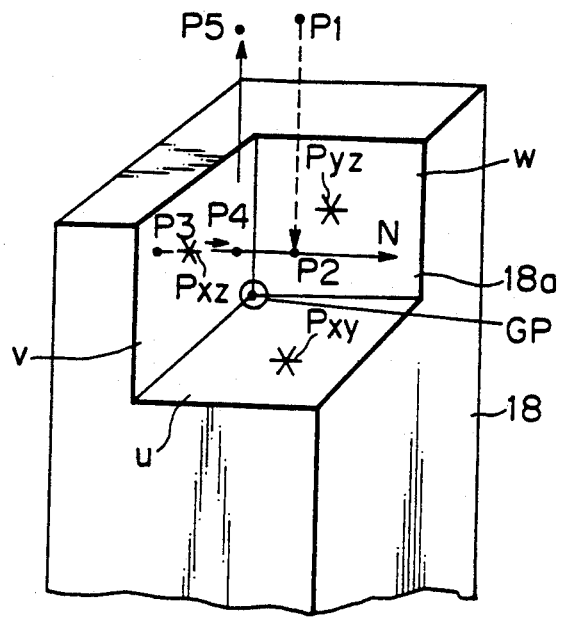
FIG. 4 is a view explaining a measurement of a recess of the jig member.
Figure 5:
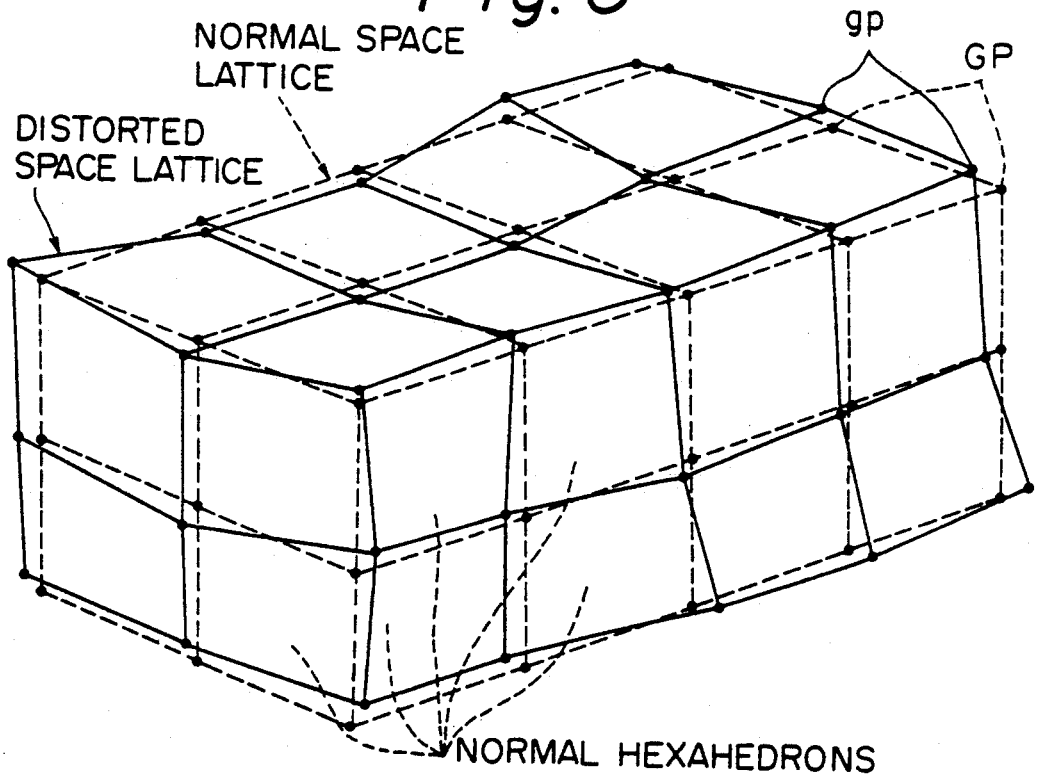
FIG. 5 is a view explaining a space lattice.

To measure the three-dimensional position of the jig member 18, the inner wall surfaces u, v, and w of each of the recesses 18a to 18c has reference points Pxy, Pxz, and Pyz indicated with "*" in FIGS. 3 and 4, as well as a space lattice point GP (an intersection of the inner wall surfaces u, v, and w) determined by the three reference points Pxy, Pxz, and Pyz. If the machine tool 3 has no distortion, the reference points Pxy, Pxz, and Pyz and space lattice point GP coincide with predetermined normal reference points Pxy, Pxz, Pyz and a predetermined normal space lattice point GP. Three-dimensional coordinates of the normal reference points Pxy, Pxz, and Pyz and normal space lattice point GP are stored in advance in a hard disk unit 36 of the information processor 7. As indicated with a dotted line in FIG. 5, the normal space lattice points GP form, when connected to one another, normal hexahedrons arranged along the axes X, Y, and Z to collectively form a parallelepiped normal space lattice in the work space of the machine tool 3. The normal space lattice points GP will be collectively referred to as a normal space lattice.

The quill 15 has a main shaft whose lower end is removably connected with a probe unit 17 or a processing tool (not shown). The probe unit 17 measures the position of the jig members 18 or of a workpiece (not shown) to be processed with the processing tool.

Figure 6:
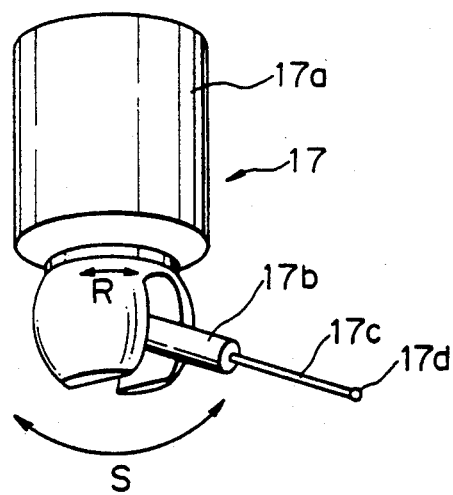
FIG. 6 is a perspective view showing a probe unit.

As shown in FIGS. 1 and 6, the probe unit 17 comprises a probe head 17a and a sensor portion 17b. The probe head 17a is fitted to the lower end of the main shaft of the quill 15. The sensor portion 17b of the probe head 17a can rotate around an axis of the probe head 17a as indicated with an arrow mark R, and also swing as indicated with an arrow mark S. The sensor portion 17b has a probe 17c and a spherical member 17d fixed to a front end of the probe 17c. When the spherical member 17d comes into contact with the surface of an object to be measured, the sensor portion 17b provides a signal. The signal detected by the sensor portion 17b is transferred to the controller 5 through a signal line (not shown). The probe unit 17 can be moved to an optional position in the three-dimensional space (work space) on the work table 12 with the moving frame 14, column 16, and quill 15. The position of the probe unit 17 is detected by linear position sensors 23, 24, and 25 fitted on the axes X, Y, and Z respectively. Since the probe head 17a can rotate and swing the sensor portion 17b, the probe 17c can take any posture with respect to an axis of the probe head 17a. This enables the probe 17c to enter the recesses 18a, 8b, and 18c of the jig member 18. When the spherical member 17d fixed to the front end of the probe 17c comes into contact with the surface of the jig member 18 or of a workpiece, the sensor portion 17b provides signals. According the output signals indicating rotational and swing angles from the probe head 17a and output signals from the linear position sensors 23, 24, and 25 on the axes X, Y, and Z, three-dimensional coordinates of the center of the spherical member 17d are found. Based on the three-dimensional coordinates of the center of the spherical member 17d and a surface normal vector N at the measuring point, a radial offset process of the spherical member 17d is carried out. Consequently, three-dimensional coordinates of a contact point of the spherical member 17d on the surface of the jig member 18 or of the workpiece can be obtained.

The controller 5 is a logical operation circuit mainly comprising a CPU 20a, ROM 20b, RAM 20c, and input/output (I/0) port 20d. The I/0 port 20d is connected to a driving unit (not shown), various sensors (not shown), and the signal line to the probe unit 17. The controller 5 also has a data communication control portion (hereinafter referred to as SIO) 20e, which is connected to the information processor 7 through a communication circuit W. According to input data from the information processor 7, the controller 5 controls movements of the frame 14, column 16, and quill 15 of the machine tool 3 as well as a measuring operation of the probe unit 17. For example, when measuring the inner wall surface v of the jig member 18, the controller 5 receives data for travel points P1 to P5 (to be described later) from the information processor 7. Based on the data, the controller 5 vertically lowers and horizontally moves (advances) the probe unit 17 so that it may plane-orthogonally come into contact with the inner wall surface v of the jig member 18. Thereafter, the controller 5 horizontally moves (backs) and vertically lifts the probe unit 17, thereby measuring the three-dimensional position of each of the jig members 18 and transmitting measured data to the information processor 7. Since these operations of the movements of the probe unit 17, measurement, and data transmission are known, they will not be explained in more detail.

The information processor 7 is a logical operation circuit mainly comprising a CPU 30a, ROM 30b, RAM 30c, and an input/output (I/0) port 30d. The I/0 port 30d is connected to an input unit 32 for inputting data and commands, a display 34 for displaying precision color images, and the hard disk unit 36 that is one of external storage units. The information processor 7 also has a data communication control portion (SIO) 30e that connected with the controller 5 through the communication circuit W. Upon receiving a data transmission request from the controller 5, the information processor 7 reads various data files in the hard disk unit 36 and sends necessary data to the controller 5 through the communication circuit W.

The display 34 displays an arrangement of the jig members 18 of FIG. 3, the reference points Pxy, Pxz, Pyz, etc.

The hard disk unit 36 stores data files for identification numbers allocated for the recesses 18a to 18c and reference points Pxy, Pxz, and Pyz of the respective jig members 18, three-dimensional data $\{P(x, y, z)\}$ for the reference points Pxy, Pxz, and Pyz of the respective jig members 18, surface normal vectors $\{N(i, j, k)\}$ indicating the opening directions of the spaces of the recesses 18a to 18c at the respective reference points Pxy, Pxz, and Pyz, etc.

Figure 7A:
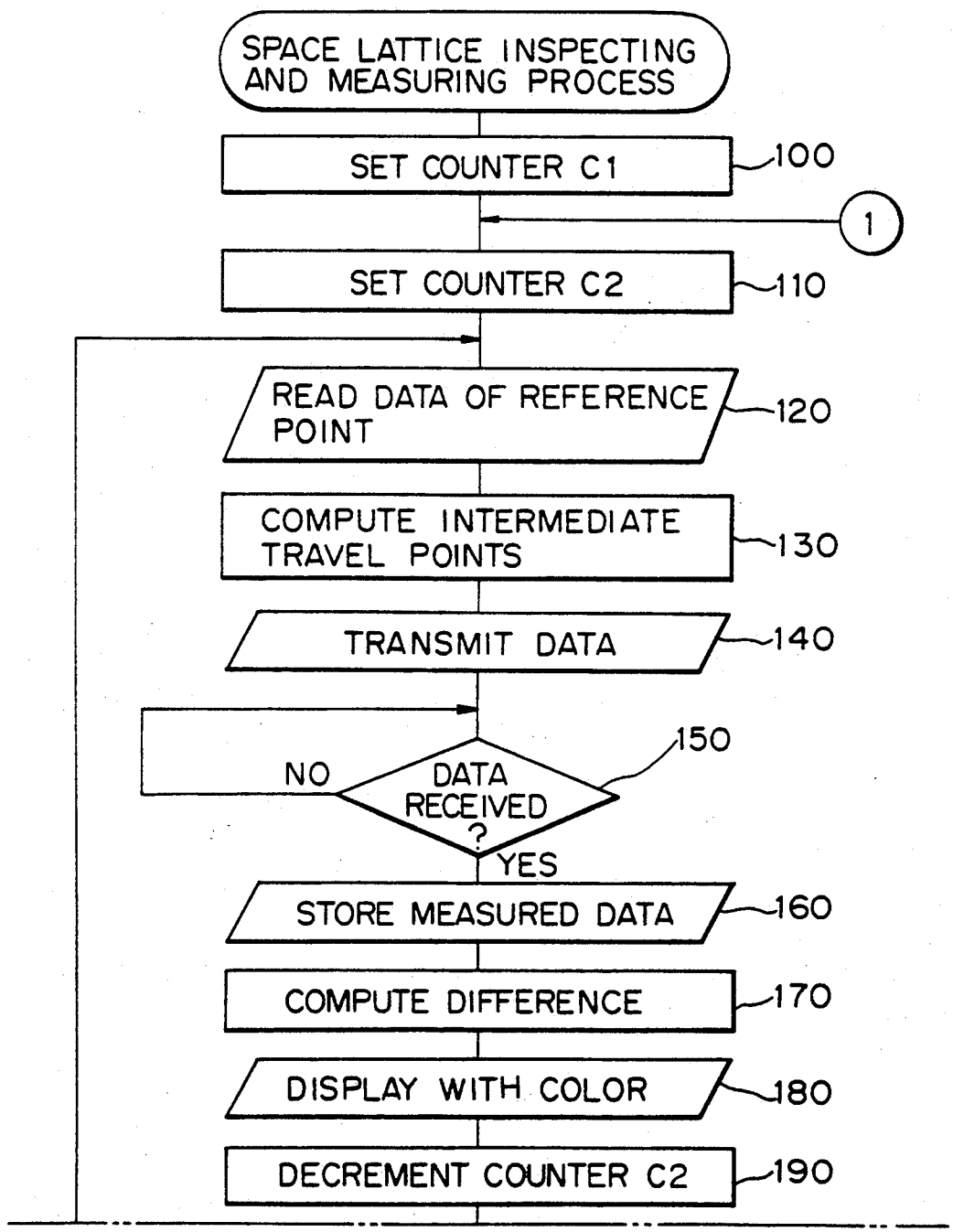
FIG. 7, which consists of FIGS. 7(A) and 7(B), is a flowchart showing a space lattice inspecting and measuring process.
Figure 7B:
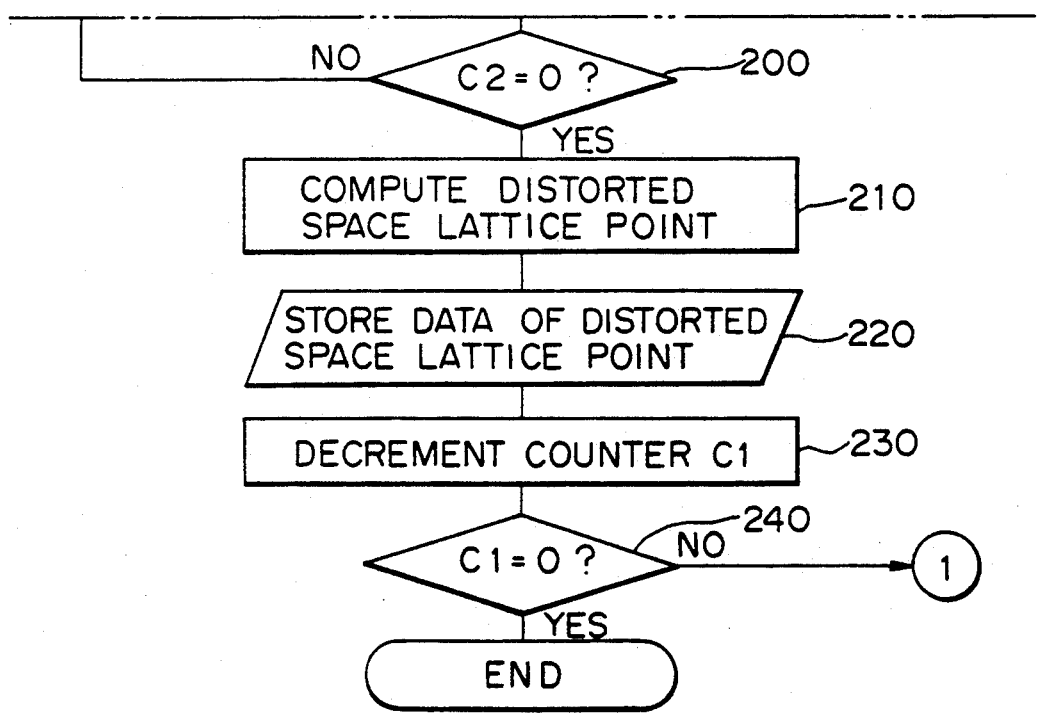

A space lattice inspecting and measuring process, which is an essential process of the present invention to be carried out in the information processor 7, will be explained with reference to a flowchart of FIG. 7, which is broken into two parts shown in FIGS. 7(A) and 7(B).

This process starts when the input unit provides an inspection and measurement instruction. First, in step 100, a total n of the recesses 18a to 18c of the jig members 18 is set as the number of measuring positions in a counter C1 for counting the number of the measuring positions. Step 110 sets, in a counter C2 for counting the number of measurements for each measuring position, the number 3 of the reference points Pxy to Pyz of each measuring position, and the flow proceeds to step 120.

The step 120 reads, in order of the identification numbers, the three-dimensional coordinate data and surface normal vector N of one of the reference points Pxy, Pxz, and Pyz of one of the recesses 18a, 18b, and 18c from the hard disk unit 36. According to the three-dimensional coordinate data read in the step 120, step 130 computes intermediate travel points necessary for the probe unit 17 to plane-orthogonally approach the reference point Pxy, Pxz, or Pyz. These intermediate travel points are a pass point P1, plane-orthogonal approach start point P2, planned measuring point P3, an escape point P4, and a shift point P5 from the escape point P4. Since the process of computing the intermediate travel points is known, a detailed explanation thereof will be omitted.

Step 140 transmits the three-dimensional coordinate data of the intermediate travel points P1 to P5 computed in the step 130 to the controller 5. The controller 5 then starts measurement. Step 150 waits for measured data (three-dimensional coordinate data) related to an actually measured point Pc (a contact point of the probe unit 17) to be sent from the controller 5. When the measured data is sent, step 160 stores the measured data in a predetermined region of the hard disk unit 26.

Step 170 computes a difference between the three-dimensional coordinate data of the measured point Pc and the three-dimensional coordinate data of corresponding one of the reference pints Pxy, Pxz, and Pyz. Step 180 displays on the display 34 a point "*" corresponding to the reference point Pxy, Pxz, or Pyz with a color that is determined depending on the level of the difference computed in the step 170.

Step 190 decrements the counter C2 by one, and step 200 determines whether or not the counter C2 is zero. If it is not zero, the flow returns to the step 120. If the counter C2 is zero, i.e., if the three reference points Pxy to Pyz have been measured and the difference levels have been displayed, the flow proceeds to step 210.

Based on the three-dimensional coordinate data and surface normal vectors N of the three measured points Pc, the step 210 computes three-dimensional coordinate data of an actual space lattice point (hereinafter referred to as the distorted space lattice point) gp. Step 220 stores the three-dimensional coordinate data of the distorted space lattice point gp computed in the step 210 in a predetermined region of the hard disk unit 36, and the flow proceeds to step 230.

The step 230 decrements the counter C1 by one, and step 240 determines whether or not the counter C1 is zero. If it is not zero, the flow returns to the step 110, but if it is zero, i.e., if the recesses 18a, 18b, and 18c of all the jig members 18 have been measured and displayed, the space lattice inspecting and measuring process ends.

As a result of the above process, the three-dimensional coordinate data of the measured points Pc and distorted space lattice points gp are stored in the hard disk unit 36. Namely, distortions of the coordinate system of the machine tool 3 can be determined as a distorted space lattice formed of the distorted space lattice points gp with respect to a normal space lattice formed of normal space lattice points GP. As indicated with a continuous line in FIG. 5, the distorted space lattice points gp form a space lattice (hereinafter referred to as the distorted space lattice) distorted from the normal space lattice.

A precise space lattice inspecting and measuring process to be carried out in the information processor 7 will be explained with reference to FIGS. 8, 8(A) and 8(B). This precise space lattice inspecting and measuring process is carried out after the space lattice inspecting and measuring process of FIG. 7 and before an actual process or measurement of a workpiece by the machine tool 3. Based on the distorted space lattice found by the space lattice inspecting and measuring process of FIG. 7, the precise space lattice inspecting and measuring process precisely measures the jig members 18 while correcting the coordinate system, thereby precisely forming a distorted space lattice.

Figure 8A:
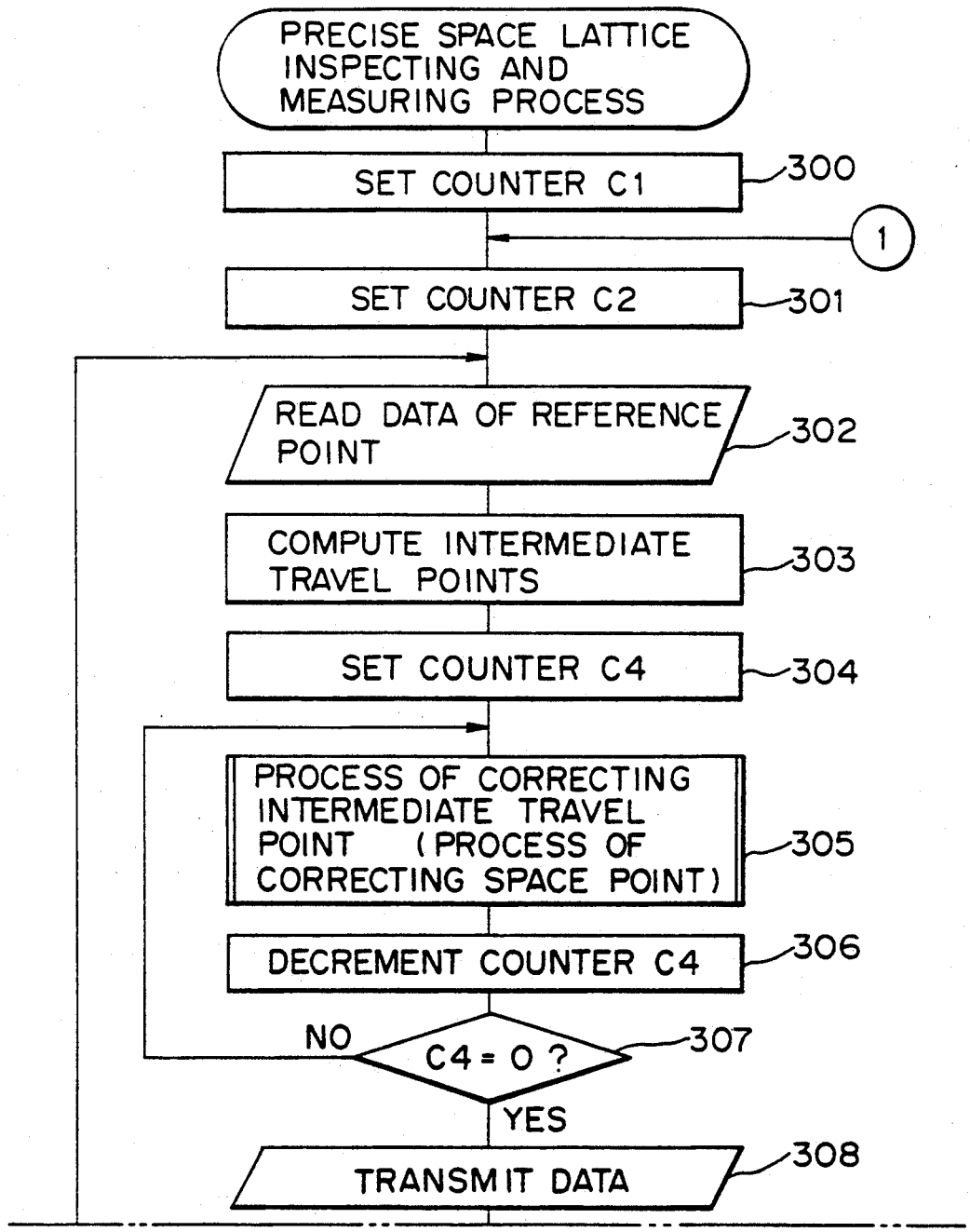
FIG. 8, which consists of FIGS. 8(A) and 8(B), is a flowchart showing a precise space lattice inspecting and measuring process.
Figure 8B:
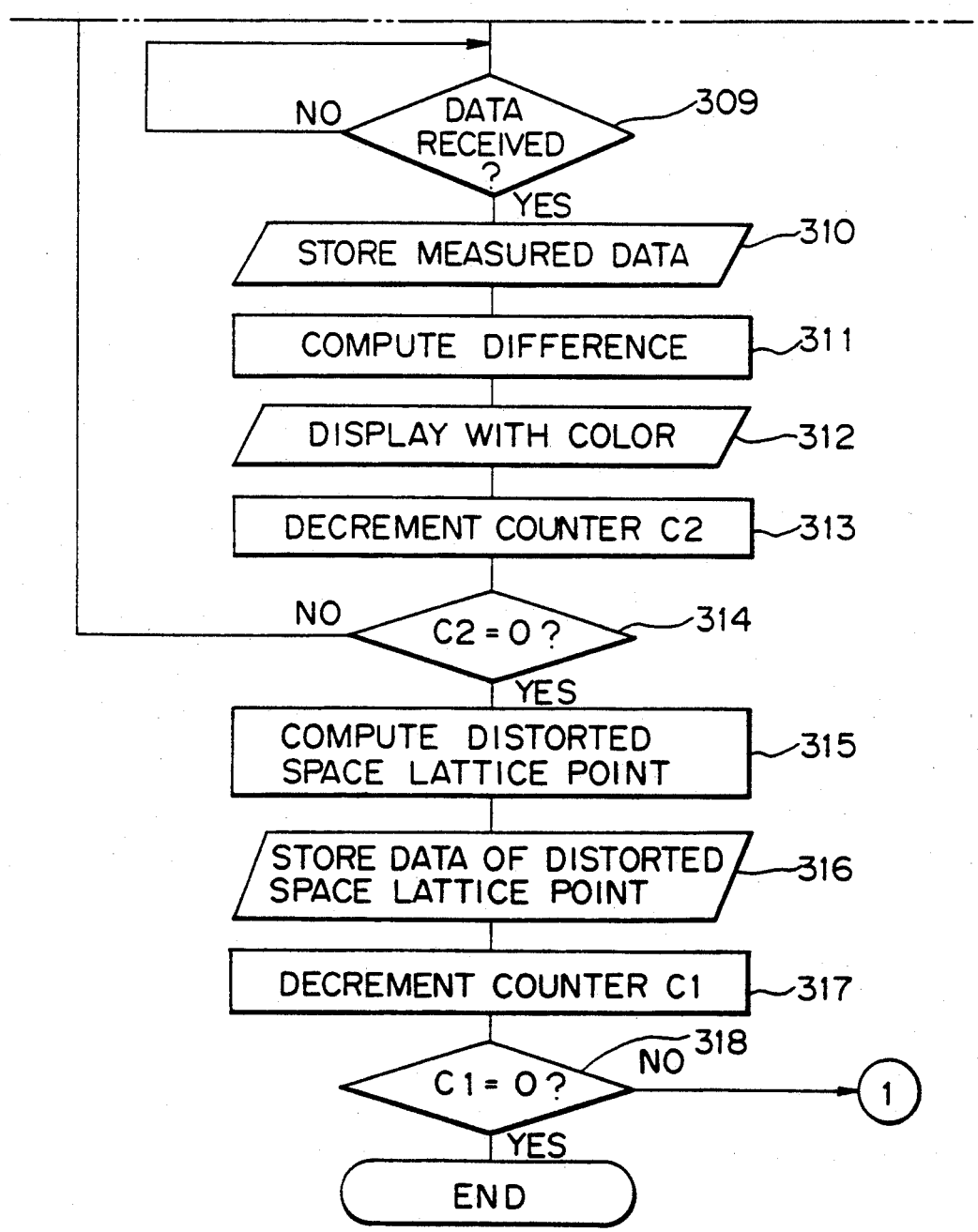

The precise space lattice inspecting and measuring process of FIG. 8 is carried out on part of the space lattice that actually relates to a coordinate system correcting process to be carried out when processing a workpiece or measuring a processed workpiece. This part of the space lattice depends on the shape of a workpiece, the position of the workpiece on the work table 12, etc. Referring to FIG. 8(A), step 300 specifies the recesses 18a, 18b, and 18c of the jig members 18 corresponding to the part of the space lattice, and sets a total nl of the specified recesses 18a, 18b, and 18c as the number of measuring positions in the counter C1, and the flow proceeds to step 301. The processes carried out in steps 301 to 303 are the same as those in the steps 110 to 130 of FIG. 7 and compute intermediate travel points P1 to P5 needed for the probe unit 17 to plane-orthogonally approach a necessary one of the reference points Pxy, Pxz, and Pyz.

Step 304 sets the number 5 of the intermediate travel points P1 to P5 in a counter C4 for counting the number of times of execution of a correcting process to be done in step 305. The step 305 corrects three-dimensional data of one of the intermediate travel points P1, P2, P3, P4, and P5 according to the distorted space lattice. Details of this correcting process will be explained later. Step 306 decrements the counter C4 by one, and step 307 determines whether or not the counter C4 is zero. If the counter C4 is not zero, the flow returns to the step 305 to correct the next intermediate travel point. If the counter C4 is zero, the flow proceeds to step 308.

After the five intermediate travel points P1 to P5 are corrected, the step 308 transmits three-dimensional coordinate data of the corrected intermediate travel points P1 to P5 to the controller 5 to start measurement. Step 309 waits for measured data (three-dimensional coordinate data) related to an actually measured point Pc (a contact point between the probe unit 17 and the surface of the recess 18a, 18b, or 18c) to be sent from the controller 5. When the data are received, step 310 stores the measured data in a predetermined region of the hard disk unit 36. The processes of the following steps 311 to 318 are the same as those in the steps 170 to 240 of FIG. 7. The step 316 stores three-dimensional coordinate data of a distorted space lattice point gp computed in the step 315 in a predetermined region of the hard disk unit 36.

Figure 11:
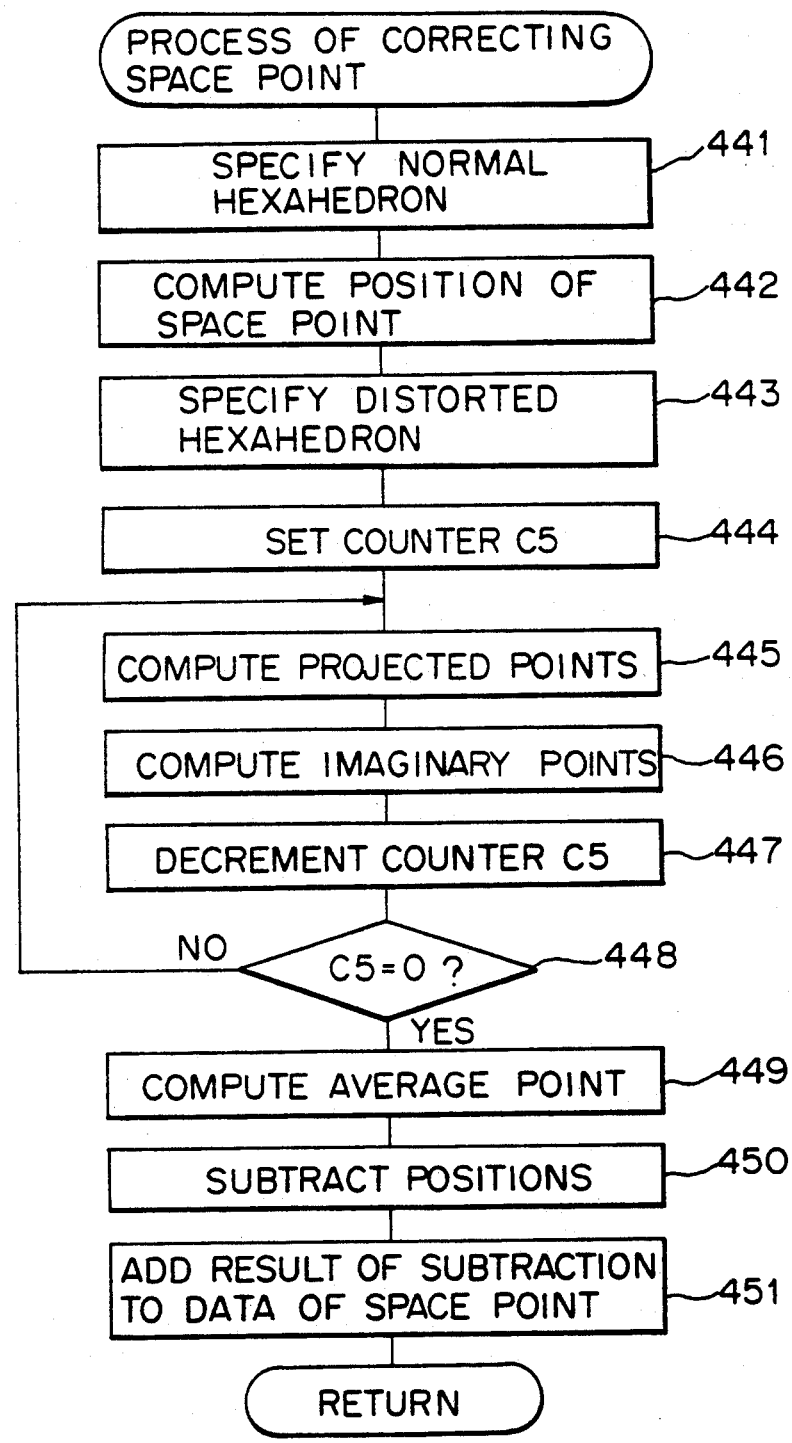
FIG. 11 is a flowchart showing a space point correcting process.

The correction process of the intermediate travel points carried out in the step 305 will be explained with reference to FIG. 11. In FIG. 11, any one of the intermediate travel points P1, P2, P3, P4, and P5 is referred to as a space point.

Figure 12:
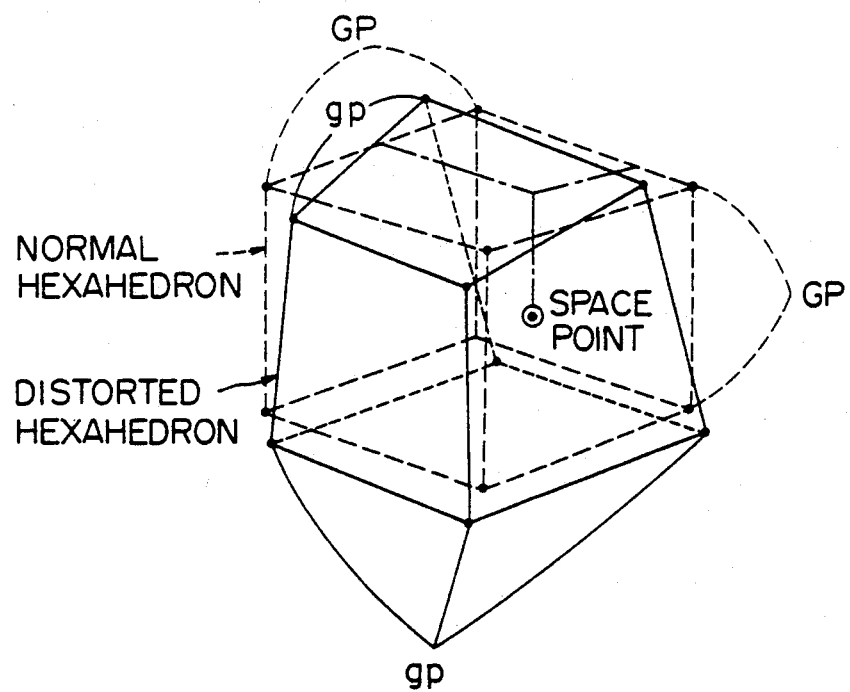
FIG. 12 is a perspective view showing a relationship between normal and distorted hexahedrons.

Referring to FIG. 11, step 441 specifies, in the normal space lattice, a normal hexahedron to which the space point belongs. For each of three pairs of opposing two faces forming the normal hexahedron, step 442 finds a ratio of distances from the two faces to the space point, and computes the position of the space point in the normal hexahedron (FIG. 12). Step 443 specifies, in the distorted space lattice, a distorted hexahedron to which the space point belongs. This step 443 automatically selects the distorted hexahedron (indicated with a continuous line in FIG. 12) that corresponds to the normal hexahedron specified in the step 441 (indicated with a dotted line in FIG. 12). Step 444 sets the number 3 of operations in a counter C5, and the flow proceeds to step 445.

Figure 13A:
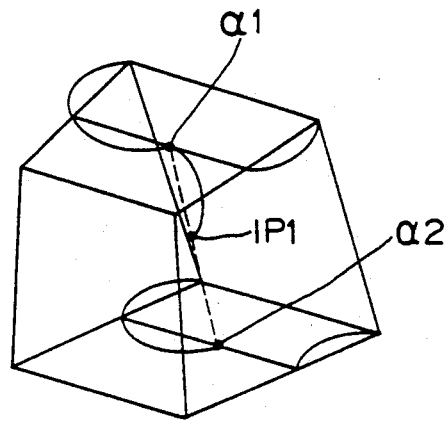
FIGS. 13(A), 13(B) and 13(C) are views explaining a method of determining the position of a space point in a distorted hexahedron.
Figure 13B:
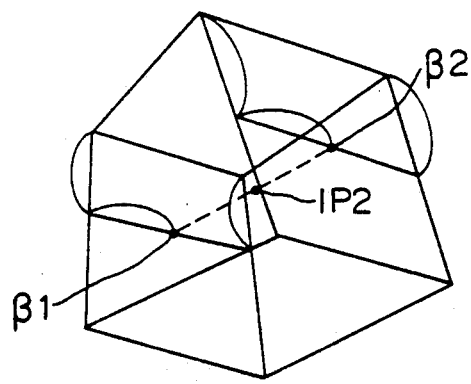
Figure 13C:
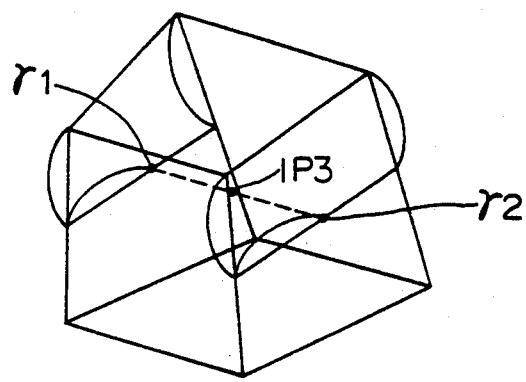

As shown in FIG. 13, the step 445 projects the space point onto one of the pairs of the opposing two faces of the distorted hexahedron, and computes projected points $\alpha1$ and $\alpha2$, or $\beta1$ and $\beta2$, or $\gamma1$ and $\gamma2$ according to a ratio of distances from opposing edges to the corresponding projected point on each of the opposing faces. This ratio will be a ratio of distances from the opposing two faces to the space point in the normal hexahedron. Step 446 finds corresponding one of imaginary points IP1, IP2, and IP3 on a straight line extending between the projected points $\alpha1$ and $\alpha2$, or $\beta1$ and $\beta2$, or $\gamma1$ and $\gamma2$ according to the ratio of distances from the opposing two faces to the space point in the normal hexahedron.

Step 447 decrements the counter C5 by one, and step 448 determines whether or not the counter C5 is zero. If the counter C5 is not zero, the flow returns to the step 445 to compute the projected points of the next pair of the opposing two faces of the distorted hexahedron. If the counter C5 is zero, the flow proceeds to step 449.

The step 449 computes an average of three-dimensional coordinate data of the three imaginary points IP1, IP2, and IP3 found in the step 446, thereby providing an average point of the three imaginary points IP1, IP2, and IP3. This average point is set as the position of the space point in the distorted hexahedron. Step 450 subtracts the three-dimensional coordinate data of the space point in the normal hexahedron computed in the step 442 from the three-dimensional coordinate data of the space point in the distorted hexahedron. The operations of the steps 442 to 450 are carried out in a coordinate system whose original point is set at one of vertexes of the normal hexahedron.

Step 451 adds a result of the subtractioin of the step 450 to the three-dimensional coordinate data of the space point in an overall coordinate system of the normal space lattice. This provides corrected three-dimensional coordinate data of the space point in the overall coordinate system of the distorted space lattice.

In this way, the step 305 of FIG. 8 three-dimensionally corrects the three-dimensional coordinate data of the intermediate travel points P1 to P5 according t to the distorted space lattice. Namely, distortions of the coordinate system due to distortions of the machine tool are three-dimensionally corrected in providing the intermediate travel points P1 to P5. Compared with the space lattice inspecting and measuring process of FIG. 7, the precise space lattice inspecting and measuring process of FIG. 8 can bring the probe unit 17 to the reference points Pxy, Pxz, and Pyz of each jig member 18 more orthogonally, and bring the probe unit 17 in contact with target positions more precisely. Accordingly, the precise space lattice inspecting and measuring process can precisely form a new distorted space lattice. In the embodiment of FIG. 8, each of the five intermediate travel points P1 to P5 is subjected to the correcting process of the step 305. It is also possible to carry out the correcting process only on the orthogonal approach start point P2 and planned measurement point P3 that directly influence measuring accuracy.

Automatic processing carried out in the information processor 7 will be explained with reference to FIG. 9. This automatic processing processes a workpiece while correcting a coordinate system according to the distorted space lattice.

Figure 9:
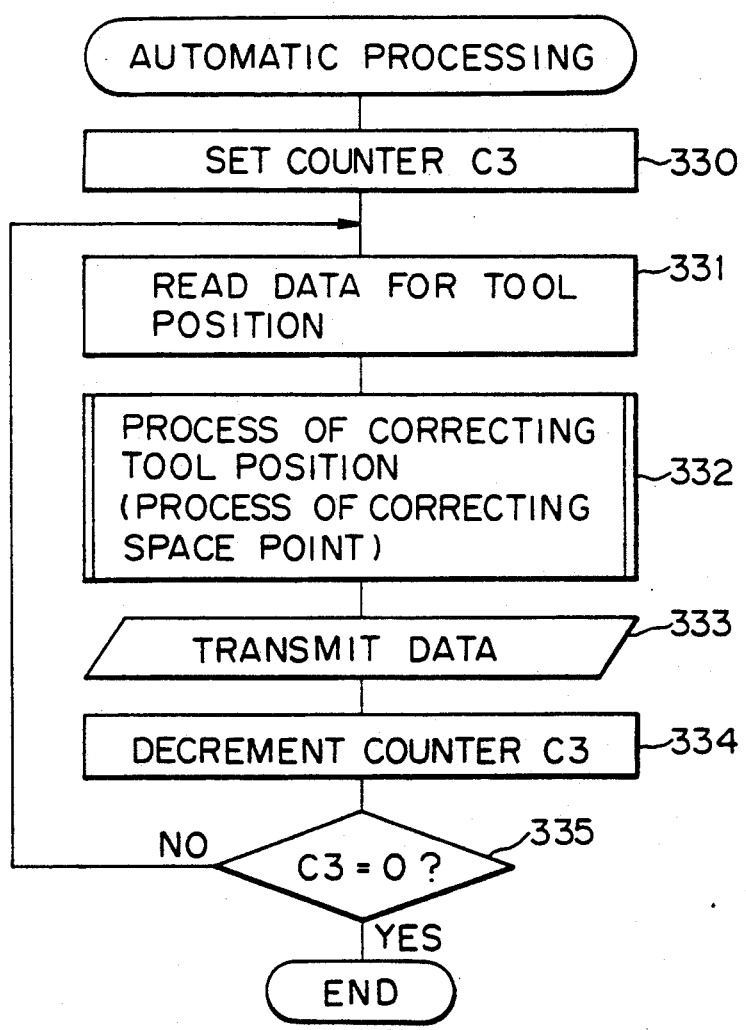
FIG. 9 is a flowchart showing an automatic processing process.

Referring to FIG. 9, step 330 sets in a counter C3 the number n2 of processing points for which three-dimensional coordinate data for the position of a tool on a process route are to be set. Step 331 reads three-dimensional coordinate data for the position of the tool for one of the processing points, out of the hard disk unit 36. Based on the distorted space lattice provided by the precise space lattice inspecting and measuring process of FIG. 8, step 332 corrects the three-dimensional coordinate data for the tool position. This correcting process is the same as the correcting process of space point of FIG. 11. Step 333 transmits the corrected three-dimensional coordinate data for the tool position to the controller 5, and the workpiece is processed. Step 334 decrements the counter C3 by one, and step 335 determines whether or not the counter C3 is zero. If the counter C3 is not zero, the flow returns to the step 331 to process the next processing point. If the counter C3 is zero, this automatic processing routine ends. With the step 332 three-dimensionally correcting the three-dimensional data of the tool position according to the distorted space lattice, the workpiece can be precisely processed.

An automatic measuring process carried out in the information processor 7 will be explained with reference to FIG. 10. This automatic measuring process measures the dimensional and geometrical accuracy of a processed workpiece.

Figure 10A:
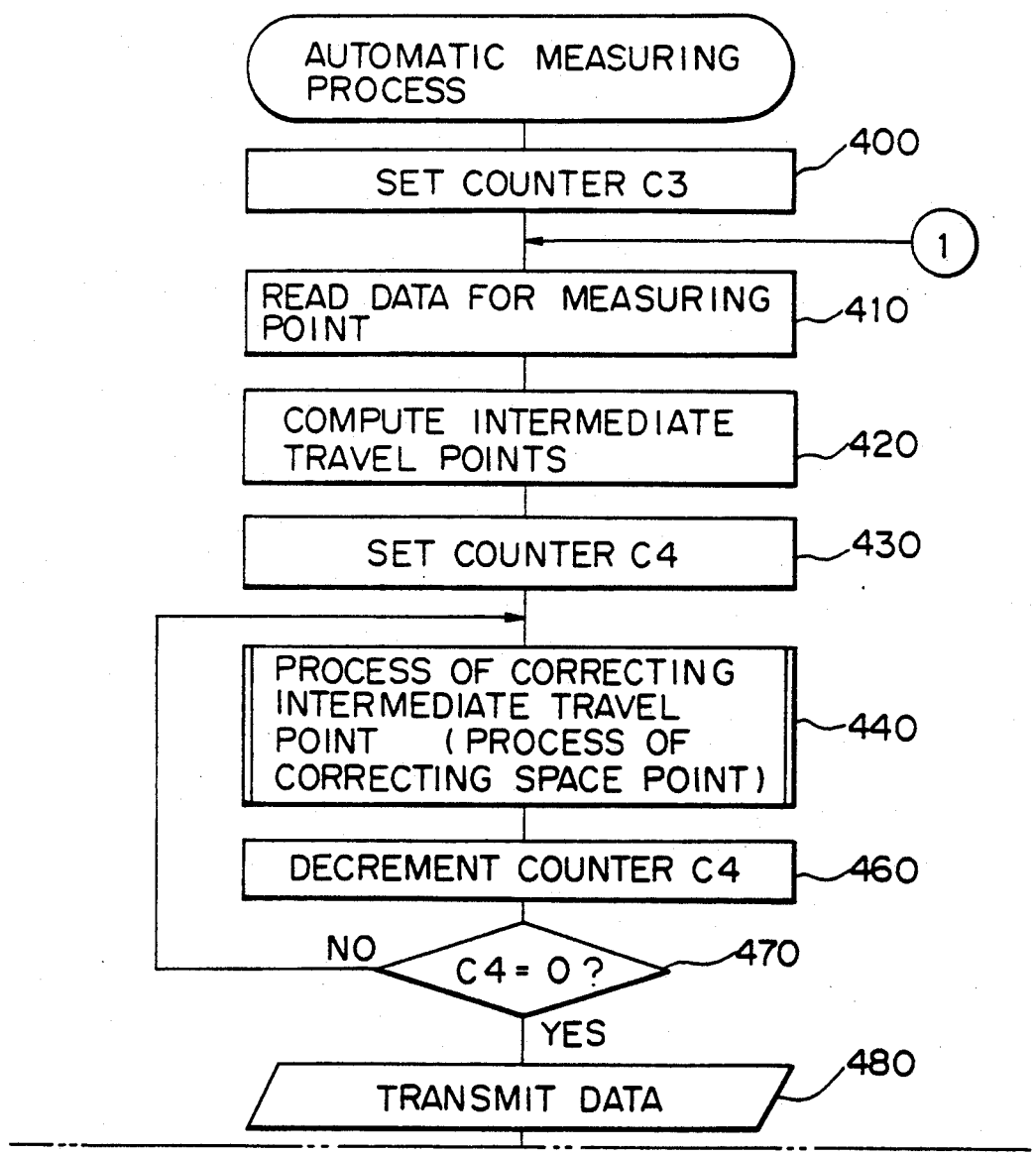
FIG. 10, which consists of FIGS. 10(A) and 10(B), is a flowchart showing an automatic measuring process.
Figure 10B:
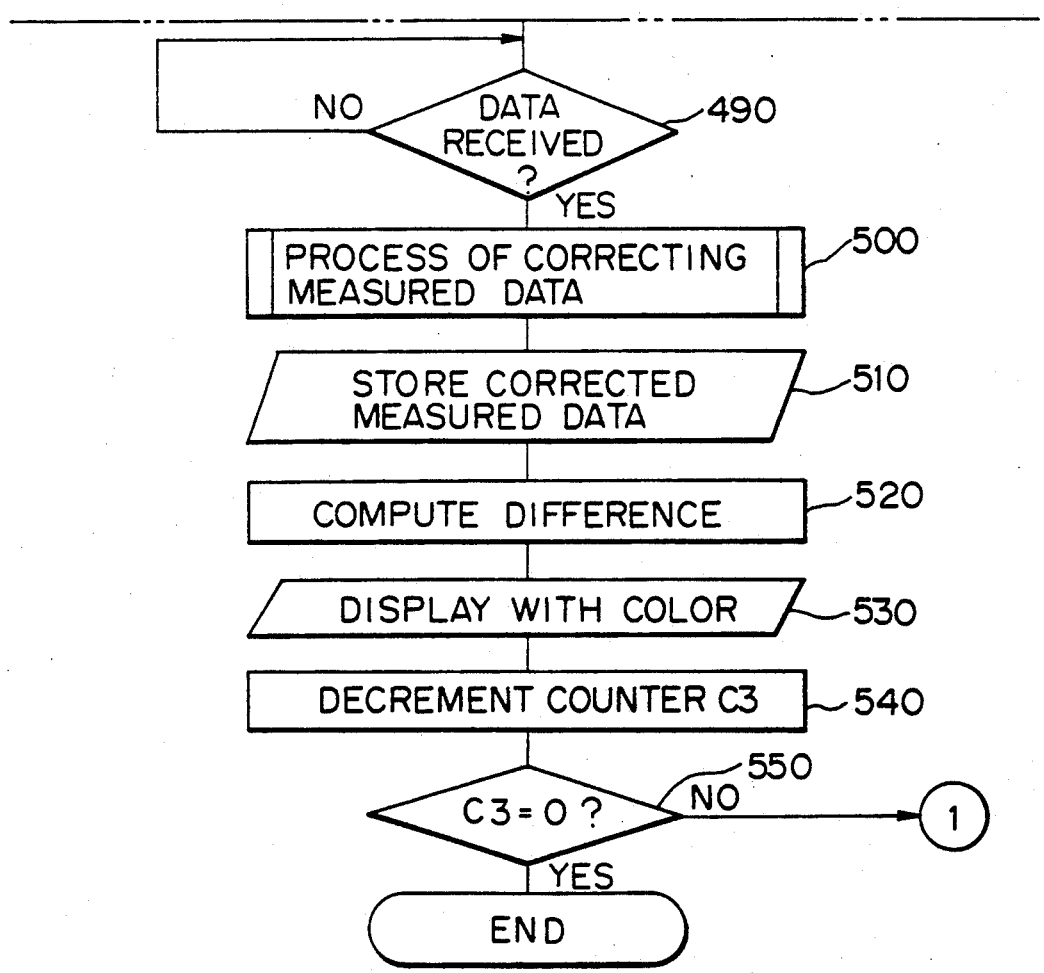

Referring to FIG. 10, step 400 sets in the counter C3 the total number n3 of measuring points Pn on the surface of a workpiece. Step 410 reads the three-dimensional coordinate data and surface normal vector of one of the measuring points Pn out of the hard disk unit 36. According to the three-dimensional coordinate data and surface normal vector of the measuring point Pn, step 420 computes intermediate travel points P1 to P5 necessary for the probe unit 17 to plane-orthogonally approach the measuring point Pn.

Step 430 sets in the counter C4 the total number 5 of the intermediate travel points P1 to P5. Step 440 corrects three-dimensional coordinate data of one of the intermediates travel points P1, P2, P3, P4, and P5 according to the distorted space lattice. This correcting process is the same as the space point correcting process of FIG. 11. Step 460 decrements the counter C4 by one, and step 470 determines whether or not the counter C4 is zero. If the counter C4 is not zero, the flow returns to the step 440 to execute the correcting process on the next intermediate travel point. If the counter C4 is zero, the flow proceeds to step 480.

After the completion of the correction of the five intermediate travel points P1 to P5, the step 480 transmits the corrected three-dimensional coordinate data of the intermediate travel points P1 to P5 to the controller 5 to start measurement. Since the three-dimensional coordinate data of the intermediate travel points P1 to P5 have been three-dimensionally corrected according to the distorted space lattice in the step 440, the probe unit 17 can accurately plane-orthogonally approach the measuring point Pn and accurately come into contact with the measuring point Pn.

Step 490 waits for measured data (three-dimensional coordinate data) of an actually measured point Pc for the measuring point Pn to be sent from the controller 5, and when the measured data is received, the flow proceeds to step 500.

The step 500 three-dimensionally corrects the measured data of the actually measured point Pc according to the distorted space lattice. The correcting process of the step 500 is opposite to the space point correcting process of FIG. 11. Namely, the three-dimensional coordinate data of the measured point Pc on a distorted coordinate system computed from the distorted space lattice points gp is converted into three dimensional coordinate data of the measured point Pc on a normal coordinate system computed from the normal space lattice points GP. An algorithm of this conversion is similar to that of the space point correcting process of FIG. 11, and therefore, a detailed explanation thereof will be omitted. Step 510 stores the corrected measured data in the hard disk unit 36.

Step 520 computes a difference between designed three-dimensional coordinate data of the measuring point Pn and the measured three-dimensional coordinate data of the measured point Pc. Step 530 displays on the display 34 a mark "*" at a position corresponding to the measuring point Pn with a color determined by a level of the difference computed in the step 520.

Step 540 decrements the counter C3 by one, and step 550 determines whether or not the counter C3 is zero. If the counter C3 is not zero, the flow returns to the step 410 to measure the next measuring point Pn. If the counter C3 is zero, this automatic measuring process routine ends.

In this way, the step 440 three-dimensionally corrects the three-dimensional coordinate data of the intermediate travel points P1 to P5 according to the normal space lattice and distorted space lattice, so that the probe unit 17 can plane-orthogonally and accurately approach the measuring point Pn and accurately get in touch with the measuring point Pn. In addition, the step 500 three-dimensionally corrects the measured data of the actually measured point Pc according to the distorted space lattice and normal space lattice, thereby improving the measuring accuracy.

As mentioned above, this embodiment forms a space lattice to divide a work space of the machine tool 3 into a plurality of hexahedron blocks, and for each of the blocks, three-dimensionally corrects distortions of a coordinate system of the machine tool 3 according to normal space lattice points GP and distorted space lattice points gp. Since the hexahedron blocks are processed one by one, the simple process of FIG. 11 can accurately and three-dimensionally correct the coordinate system, thereby ensuring a good processing and measuring accuracy. Also, the block-by-block processing can shorten an operation time of the correction.

When a workpiece does not require a high dimensional and geometrical accuracy, the precise space lattice inspecting and measuring process of FIG. 8 can be omitted. In this case, the space lattice inspecting and measuring process of FIG. 7 provides a distorted space lattice, and based on this distorted space lattice, the tool position correcting process of FIG. 9 and the process of FIG. 10 for correcting the position of the probe unit 17 can be carried out.

According to the present invention, a reference coordinate system of a machine tool is accurately and three-dimensionally corrected block by block in space lattices formed from normal space lattice points and distorted space lattice points, thereby ensuring a good positional accuracy, processing accuracy, and measuring accuracy on the machine tool, and realizing a short processing time when correcting the reference coordinate system.

Although the invention has been described by reference to a specific embodiment chosen for purposes of illustration, it should be apparent that numerous modifications could be made thereto by those skilled in the art without departing from the basic concept and scope of the invention.

I claim:

1. A coordinate system correcting apparatus for correcting a reference coordinate system set for a work space of a machine tool, the coordinate system of the machine tool having orthogonal axes X, Y, and Z, the coordinate system correcting apparatus comprising:

jig means for defining a plurality of space lattice points that are three-dimensionally arranged to serve as references of a reference coordinate system, the space lattice points defined by the jig means coinciding with predetermined normal space lattice points when the machine tool is not distorted, wherein eight adjacent normal space lattice points are positioned at vertexes of a hexahedron respectively, any one of three pairs of opposing two faces of the hexahedron being in parallel with each other and the three pairs of opposing two faces of the hexahedron being in parallel with planes X-Y, X-Z, and Y-Z of the coordinate system of the machine tool respectively;

storage means for storing the positions of the normal space lattice points;

measuring means for measuring distorted space lattice points defined by the jig means, the distorted space lattice points deviating from the normal space lattice points when the machine tool is distorted; and correcting means for three-dimensionally correcting the reference coordinate system according to each normal hexahedron formed from eight adjacent normal space lattice points and each corresponding distorted hexahedron formed from eight adjacent distorted space lattice points.

2. A coordinate system correcting apparatus as set forth in claim 1, wherein the jig means comprises a plurality of jig members distributed on a work table of the machine tool, each of the jig members extending along the Z axis orthogonal to the work table and having a recess shaped as a right-angled parallelepiped and located at a position corresponding to one of the normal space lattice points, and wherein a point at which all of the three orthogonal planes of the recess intersect forms one of space lattice points defined by the jig means.

3. A coordinate system correcting apparatus as set forth in claim 2, wherein each of the jig members has a plurality of recesses disposed along the Z axis and separated from one another, and wherein a point at which all of the three orthogonal planes of each of the recesses intersect forms one of space lattice points defined by the jig means.

4. A coordinate system correcting apparatus as set forth in claim 3, wherein the three orthogonal planes of each of the recesses for forming the space lattice points defined by the jig means are in parallel with the planes X-Y, X-Z, and Y-Z, respectively.

5. A coordinate system correcting apparatus as set forth in claim 4, wherein the measuring means has a probe for providing a signal when coming into contact with the surface of an object to be measured, and three linear position sensors for providing coordinates on the X, Y, and Z axes of the machine tool, respectively.

6. A coordinate system correcting apparatus as set forth in claim 5, wherein a reference point is set on each of the three orthogonal planes of each of the recesses of the jig member, and according to three-dimensional coordinates measured by the measuring means of the reference points on the three planes, three-dimensional coordinates of one of the distorted space lattice points defined by the jig means are computed.

7. A coordinate system correcting apparatus as set forth in claim 6, further comprising display means for displaying the magnitude of a three-dimensional distortion of the machine tool obtained at each reference point from the measured three-dimensional coordinates of the reference point.

8. A coordinate system correcting apparatus as set forth in claim 6, further comprising display means for displaying the magnitude of a three-dimensional distortion of the machine tool obtained at each reference point from the measured three-dimensional coordinates of the reference point with predetermined colors depending on the magnitude of the distortion.

9. A coordinate, system correcting apparatus as set forth in claim 6, wherein, to process a workpiece, the coordinate system is three-dimensionally corrected according to each normal hexahedron formed from eight adjacent normal space lattice points and each corresponding distorted hexahedron formed from eight adjacent distorted space lattice points, and three-dimensional coordinate instruction values for the position of a tool in a distorted coordinate system computed from the distorted space lattice points are computed.

10. A coordinate system correcting apparatus as set forth in claim 6, wherein, to measure a processed workpiece, the coordinate system is three-dimensionally corrected according to each normal hexahedron formed from eight adjacent normal space lattice points and each corresponding distorted hexahedron formed from eight adjacent distorted space lattice points, and three-dimensional coordinate instruction values for the position of the probe in a distorted coordinate system computed from the distorted space lattice points are computed.

11. A coordinate system correcting apparatus as set forth in claim 9 or 10, wherein the position of the tool or the probe in the distorted hexahedron is computed according to three sets of ratios of distances from three pairs of opposing two faces of the normal hexahedron to the position of the tool or the probe, thereby computing the three-dimensional coordinate instruction values of the position of the tool or the probe in the distorted coordinate system.

12. A coordinate system correcting apparatus as set forth in claim 11, wherein three sets of ratios of distances from three pairs of opposing two faces of the normal hexahedron to the position of the tool or the probe are employed to find projected points of the position of the tool or the probe on each of the six planes of the distorted hexahedron, the projected points on the three pairs of the opposing two faces of the distorted hexahedron are connected to each other to provide three straight lines on which three imaginary points corresponding to the position of the tool or the probe are set according to the ratios of the distances, and the three imaginary points are arithmetically averaged to provide an averaged point whose three dimensional coordinates serve as three-dimensional coordinate instruction values for the position of the tool or the probe in the distorted coordinate system.

13. A coordinate system correcting apparatus as set forth in claim 6, wherein, to measure a processed workpiece, measured three-dimensional coordinates of the workpiece in a distorted coordinate system computed from the distorted space lattice points are three-dimensionally converted into measured three-dimensional coordinates of the workpiece in a normal coordinate system computed from the normal space lattice points.

14. A coordinate system correcting apparatus as set forth in claim 13, wherein the coordinate system is three-dimensionally changed according to each distorted hexahedron formed from eight adjacent distorted space lattice points and each corresponding normal hexahedron formed from eight adjacent normal space lattice points, thereby computing measured three-dimensional coordinates of the workpiece in the normal coordinate system.

15. A coordinate system correcting apparatus as set forth in claim 14, wherein a measured point of the workpiece in the normal hexahedron is computed according to three sets of ratios of distances from three pairs of opposing two faces of the distorted hexahedron to the measured point of the workpiece, thereby computing measured three-dimensional coordinates of the workpiece in the normal coordinate system.

* * * * *